(12) United States Patent
Aldridge et al.

(10) Patent No.: US 10,126,787 B1
(45) Date of Patent: Nov. 13, 2018

(54) COMPUTING DEVICE MOUNTING ENCLOSURES

(71) Applicant: Hewlett-Packard Development Company, L.P., Houston, TX (US)

(72) Inventors: Randol D. Aldridge, Houston, TX (US); Yu Wei Tan, Taipei (TW); Cheng Yan Chiang, Taipei (TW); Jeffrey A. Lev, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/708,587

(22) Filed: Sep. 19, 2017

(51) Int. Cl.
*G06F 1/18* (2006.01)
(52) U.S. Cl.
CPC .................................. *G06F 1/181* (2013.01)
(58) Field of Classification Search
CPC ....................................................... G06F 1/181
See application file for complete search history.

(56) References Cited

U.S. PATENT DOCUMENTS

| | | | | |
|---|---|---|---|---|
| 5,941,493 | A * | 8/1999 | Cheng | F16M 11/105 248/371 |
| 5,973,916 | A * | 10/1999 | Han | G06F 1/1601 348/836 |
| 6,081,420 | A * | 6/2000 | Kim | G06F 1/16 248/224.61 |
| 6,157,423 | A * | 12/2000 | Stonebraker | G02F 1/133308 248/918 |
| 6,366,453 | B1 * | 4/2002 | Wang | G06F 1/16 248/917 |
| 6,856,506 | B2 * | 2/2005 | Doherty | G06F 1/1632 16/329 |
| 7,159,053 | B1 | 1/2007 | Lakin | |
| 7,499,272 | B2 * | 3/2009 | Searby | F16M 11/041 248/917 |
| 7,502,226 | B2 | 3/2009 | Searby et al. | |
| 7,551,432 | B1 * | 6/2009 | Bockheim | F16M 11/10 361/679.07 |
| 7,593,219 | B2 * | 9/2009 | Quijano | F16M 11/10 248/923 |
| 7,719,832 | B2 | 5/2010 | Kobara et al. | |
| 7,845,608 | B1 * | 12/2010 | Chen | G06F 1/181 248/297.21 |
| 7,854,415 | B2 * | 12/2010 | Holbrook | F16M 11/10 248/125.2 |

(Continued)

FOREIGN PATENT DOCUMENTS

TW          201319784 A        5/2013

OTHER PUBLICATIONS

Dell Wyse P25 Class Dual Vesa Mounting Bracket Kit—Thin Client to Monitor Mounting Kit—for Dell Wyse P25 Zero Client, https://www.walmart.com/ip/Dell-Wyse-P25-class-dual-VESA-mounting-bracket-kit-Thin-client-to-monitor-moun/37172222.

(Continued)

*Primary Examiner* — Lisa Lea Edmonds
(74) *Attorney, Agent, or Firm* — HPI Patent Department

(57) ABSTRACT

An example mounting enclosure comprises a frame to be arranged between a display device and a support structure, a slidable access cover to slidably engage the frame of the mounting enclosure, a mounting interface to connect the frame to the support structure, a computing device reception bracket to receive a computing device, and a power supply storage portion.

20 Claims, 9 Drawing Sheets

(56) References Cited

U.S. PATENT DOCUMENTS

| | | | | |
|---|---|---|---|---|
| 7,918,426 B2* | 4/2011 | Short | F16M 11/105 | 248/225.11 |
| 8,059,399 B2* | 11/2011 | Huang | F16M 11/16 | 248/176.1 |
| 8,456,862 B2* | 6/2013 | Lee | F16M 11/10 | 361/679.01 |
| 8,693,172 B2* | 4/2014 | Russell | F16M 11/10 | 248/921 |
| 9,042,092 B2* | 5/2015 | Lu | F16M 11/041 | 248/917 |
| 2005/0068718 A1* | 3/2005 | Cheng | F16M 11/041 | 361/679.22 |
| 2006/0238966 A1* | 10/2006 | Sung | F16M 11/046 | 361/679.05 |
| 2006/0291152 A1* | 12/2006 | Bremmon | F16M 11/10 | 361/679.06 |
| 2007/0103856 A1* | 5/2007 | She | G06F 1/1601 | 361/679.22 |
| 2007/0139870 A1* | 6/2007 | Lin | F16M 11/10 | 361/679.22 |
| 2007/0153459 A1* | 7/2007 | Wohlford | F16M 11/105 | 361/679.22 |
| 2010/0097540 A1* | 4/2010 | Shen | F16M 11/105 | 349/60 |
| 2010/0321876 A1* | 12/2010 | Liu | G06F 1/1601 | 361/679.22 |
| 2011/0157805 A1* | 6/2011 | Mi | F16M 11/041 | 361/679.22 |
| 2013/0222996 A1* | 8/2013 | Stokman | G06F 1/1607 | 361/679.22 |
| 2014/0085799 A1* | 3/2014 | Drew | F16M 11/105 | 361/679.22 |
| 2014/0321039 A1* | 10/2014 | Quijano | G06F 1/1601 | 361/679.22 |
| 2016/0113130 A1* | 4/2016 | Le | G02F 1/0105 | 361/679.01 |

OTHER PUBLICATIONS

LCD / Thin Client PC Wall Mount—15" to 22" Monitors, http://www.server-rack-online.com/wmtc-m.html.

* cited by examiner

COMPUTING DEVICE MOUNTING ENCLOSURES

BACKGROUND

In certain types of situations, such as for security or aesthetics, computing devices may be mounted, attached, or fixed to a surface or structure. Mounting devices may include enclosures. At times, mounting enclosures may be arranged between a support structures (e.g., a support arm) and a display.

BRIEF DESCRIPTION OF THE DRAWINGS

Various examples will be described below by referring to the following figures.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

At times, there may be a desire to mount (e.g., to place, fix, or fasten on or in a support or storage mechanism) a computing device. For example, a computing device may be mounted in an enclosure for security or aesthetic reasons. As used herein, an "enclosure" refers to a device or mechanism that encloses, at least partially, a computing device. In restaurants and stores, for instance, a computing device may be mounted behind displays, such as to enable the displays to provide information to customers, by way of example. For instance, in a restaurant, displays may be used to show a menu, new items, or to play advertisements, by way of example. In a store, displays may be used to advertise products or sales.

Accessing mounted computing devices, such as for repair or maintenance, may present certain challenges, however. For example, if a computing device is mounted behind a display, accessing the computing device may include removal of the display. In other cases, accessing the computing device may comprise disassembly of an enclosure. In the case of a restaurant, removal of a monitor and disassembly of an enclosure may lead to closing a portion of the restaurant for an hour or more while service is performed. There may be a desire, therefore, for a mechanism for a computing device mount that may nevertheless allow access to a computing device without necessarily removing a display or disassembling an enclosure.

In one implementation, therefore, an enclosure for a computing device may comprise a reception bracket capable of receiving and/or releasing a computing device within the enclosure without tools. For instance, in one case the computing device may be attached and detached from the reception bracket without installation or removal of fasteners, such as screws or bolts. Additionally, the enclosure may comprise an access cover capable of supporting the weight of a display during maintenance, installation, and removal operations. For example, the access cover may include one or more tabs or prongs configured to engage with apertures in the enclosure. Thus, a display may be attached to the access cover, and the access cover may be attached to the enclosure (e.g., using the tabs), and fasteners may be installed to secure the access cover to the enclosure. Such an enclosure may render the tasks of maintenance, assembly, and disassembly (e.g., removing panels, covers, and members from a frame of an enclosure) less time-consuming, by way of example.

Figure 1A:
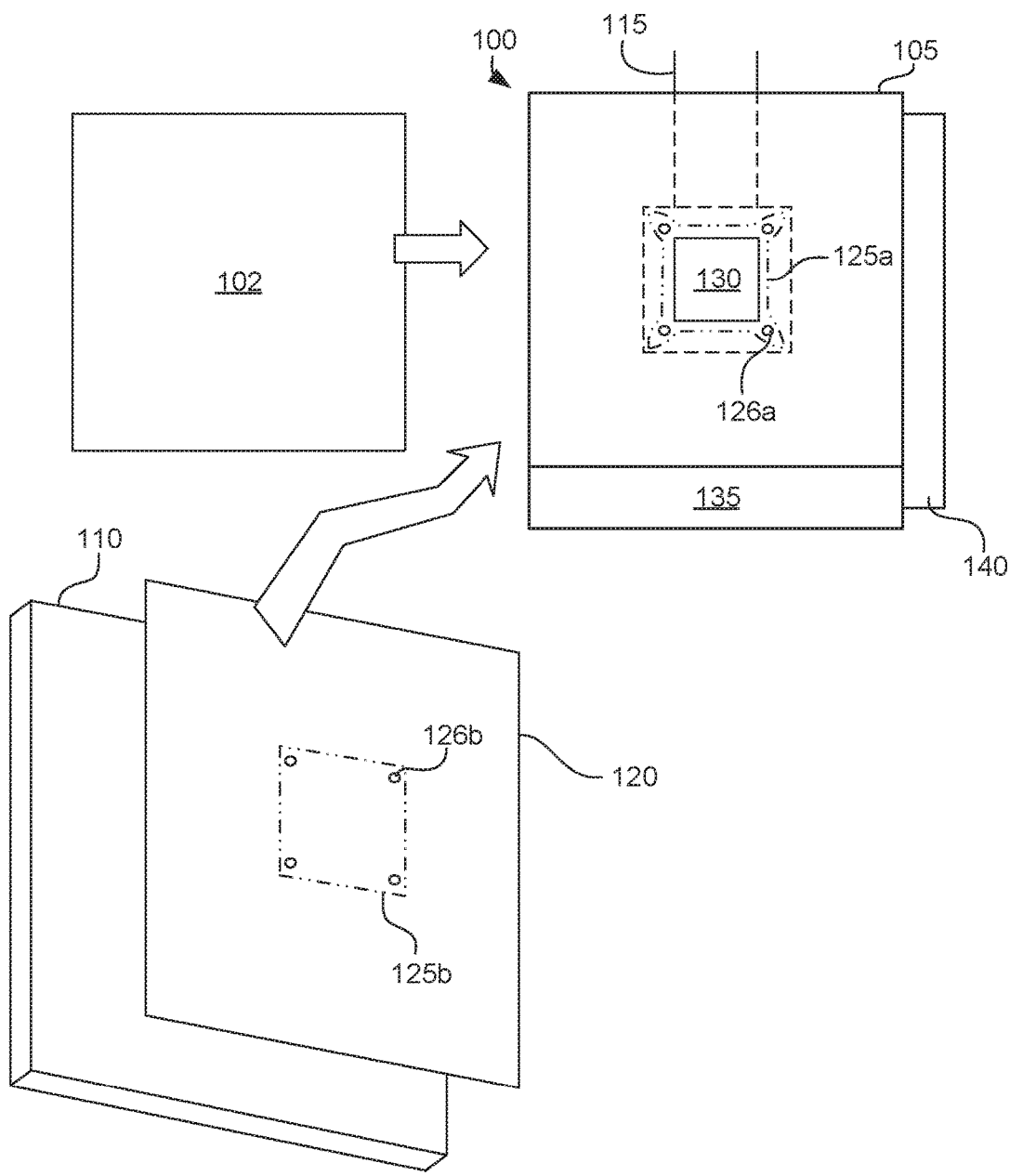
FIGS. 1A and 1B illustrate an example mounting enclosure, computing device, and display.
Figure 1B:
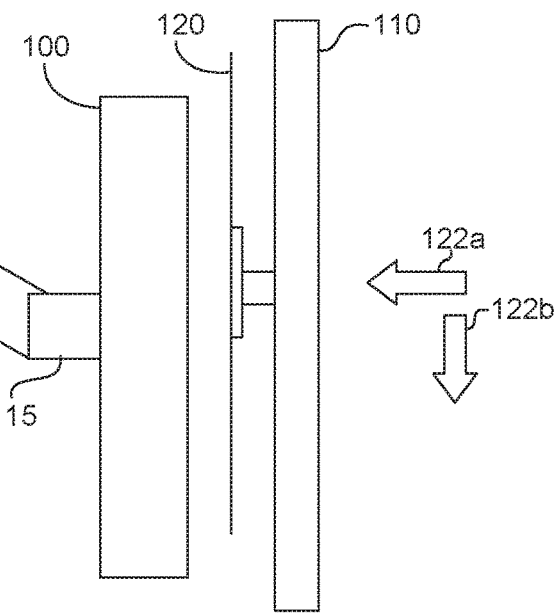

An example enclosure 100 is illustrated in FIGS. 1A and 1B, demonstrating elements and features that may reduce maintenance, assembly, and disassembly complexity of system comprising an enclosure, a computing device, and a display. As shown in FIG. 1A, enclosure 100 may comprise a frame 105. FIG. 1A illustrates an example computing device 102 moving towards (see, e.g., the arrow pointing from computing device 102 to enclosure 100) enclosure 100. As computing device 102 enters enclosure 100, it may attach to a reception bracket 130, such as without tools or fasteners (e.g., screws or bolts). An example reception bracket may thus be referred to as a toolless reception bracket. In one case, reception bracket 130 (e.g., a toolless reception bracket) may slide into a groove of computing device 102 and a clasping mechanism may secure computing device 102 into place on reception bracket 130.

A portion 135 of enclosure 100 may be arranged in proximity to computing device 102 in order to receive cords and/or a power supply of computing device 102 and/or a display 110. Power supply storage portion 135 of enclosure 100 may comprise a dedicated recess within enclosure 100 for holding a power supply and cabling.

Port cover 140 may be arranged at a portion of enclosure 100 where cables may run between computing device 102, display 110, power supply storage portion 135, and an electrical outlet, by way of example. For example, port cover 140 may be removable to allow access to ports of computing device 102 and cables. Port cover 140 may obscure cabling while attached to frame 105. In one implementation, port cover 140 may comprise engagement features (e.g., prongs) that may be capable of engaging a portion of frame 105, by way of illustration.

Enclosure 100 may be connected to a support structure 115, which may comprise a support arm connected to a structure, such as a wall or a ceiling. Support structure 115 is illustrated with solid lines above enclosure 100 and dashed lines behind enclosure 100. Support structure 115 may connect to enclosure 100 via a mounting interface 125a (see dash-dot-dot line). Mounting interface 125a may comprise components, such as apertures (e.g., example aperture 126a) or fasteners, for connecting enclosure 100 to support structure 115. Standard mounting interface arrangements (e.g., comprising mounting apertures) may be established by groups or organizations, such as the Video Electronics Standards Association (VESA). For example, the VESA has established flat display mounting interface (FDMI) standards that specify distances between apertures based on, for instance, display size. Thus, as used herein, mounting interfaces, such as 125a, represent presently established standards for mounting interfaces and also standards to be established in the future. Furthermore, future standards could also extend beyond standards established by the Video Electronics Standards Association, such as to standards established (or to be established in the future) by other standards organizations.

An example access cover 120 may connect to display 110 via mounting interface 125b (see dash-dot-dot line) comprising apertures, such as example aperture 126b. Access cover 120 is connectable to enclosure 100. In one case, access cover 120 may capable of sliding into place on enclosure 100 to as to engage and support display 110, such as while fasteners are attached to secure access cover 120 into place. In one example case, access cover 120 may be moved towards enclosure 100 in a slightly offset fashion to allow connection mechanisms (not shown) to align with openings on enclosure 100. FIG. 1B illustrates access cover 120 as being slightly offset with regards to enclosure 100. Arrow 122a shows a direction in which access cover 120 may travel until contact with enclosure 100 (e.g., to engage connection mechanisms of access cover 120). Contact between access cover 120 and enclosure 100 may comprise engagement of features of access cover 120 and enclosure 100. For instance, tabs of access cover 120 may engage receptacles (e.g., slots) of frame 105 of enclosure 100. Once connection mechanisms are engaged, then access cover 120 may travel in a direction shown by arrow 122b. After travelling in the direction shown by arrow 122b, access cover 120 may be capable of supporting display 110, such as while fasteners (e.g., thumbscrews) are installed (e.g., to secure access cover into place on enclosure 100).

Figure 2A:
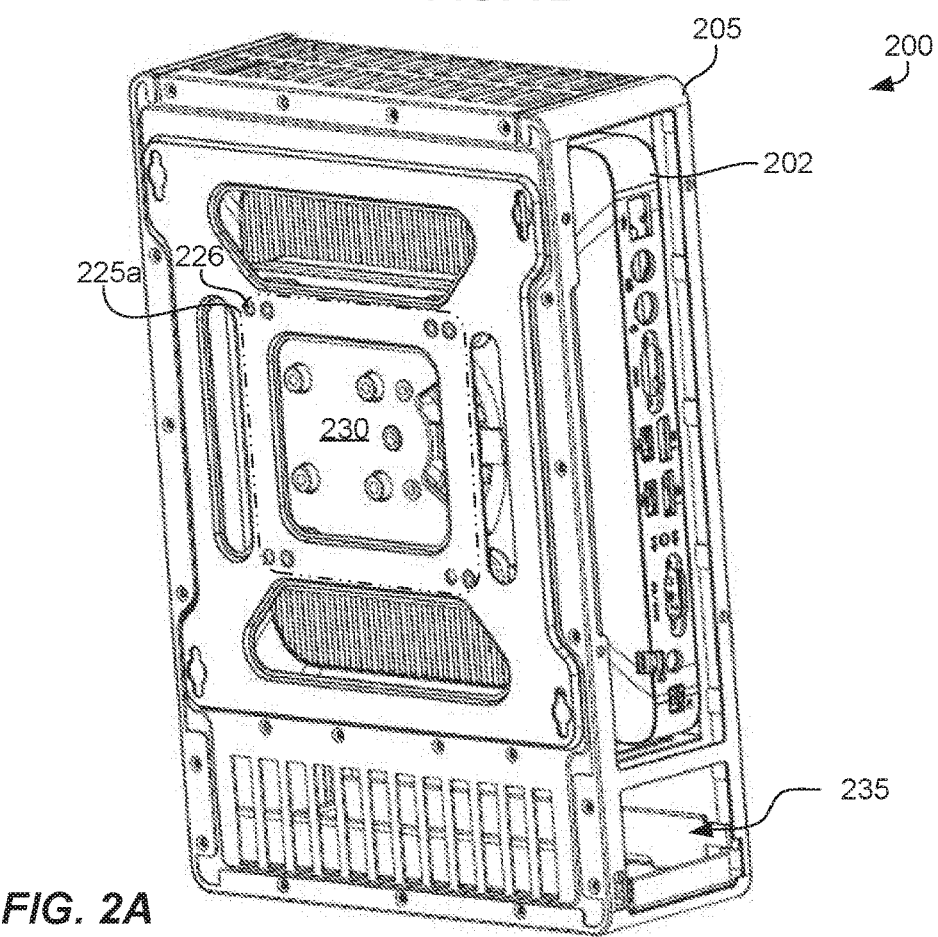
FIGS. 2A-2G illustrate an example mounting enclosure from different perspectives.

With the foregoing description in mind, several example enclosures are discussed in the following paragraphs. For example, FIG. 2A illustrates an example enclosure 200 comprising a frame 205, and having a mounting interface 225a (see dash-dot-dot line), such as to attach enclosure 200 to a support structure. The dash-dot-dot line surrounding mounting interface 225a indicates a number of apertures, such as example aperture 226, through which a fastener may be secured to secure enclosure 200 to a support structure. As shown in FIG. 2A, a computing device 202 may be inserted into enclosure 200 and secured using a reception bracket 230 (e.g., a toolless reception bracket).

FIG. 2A also illustrates and example power supply storage portion 235. Computing device 202 may have a number of ports such as a power supply input port through which electrical power may enter computing device 202. A power supply may attach to the power supply input port and also to a source of electrical power, such as via a wall outlet. The power supply may be arranged within power supply storage portion 235. Additionally, to the extent that there are other cables attached to ports of computing device 202, excess length of cables may be stored within storage portion 235.

Figure 2B:
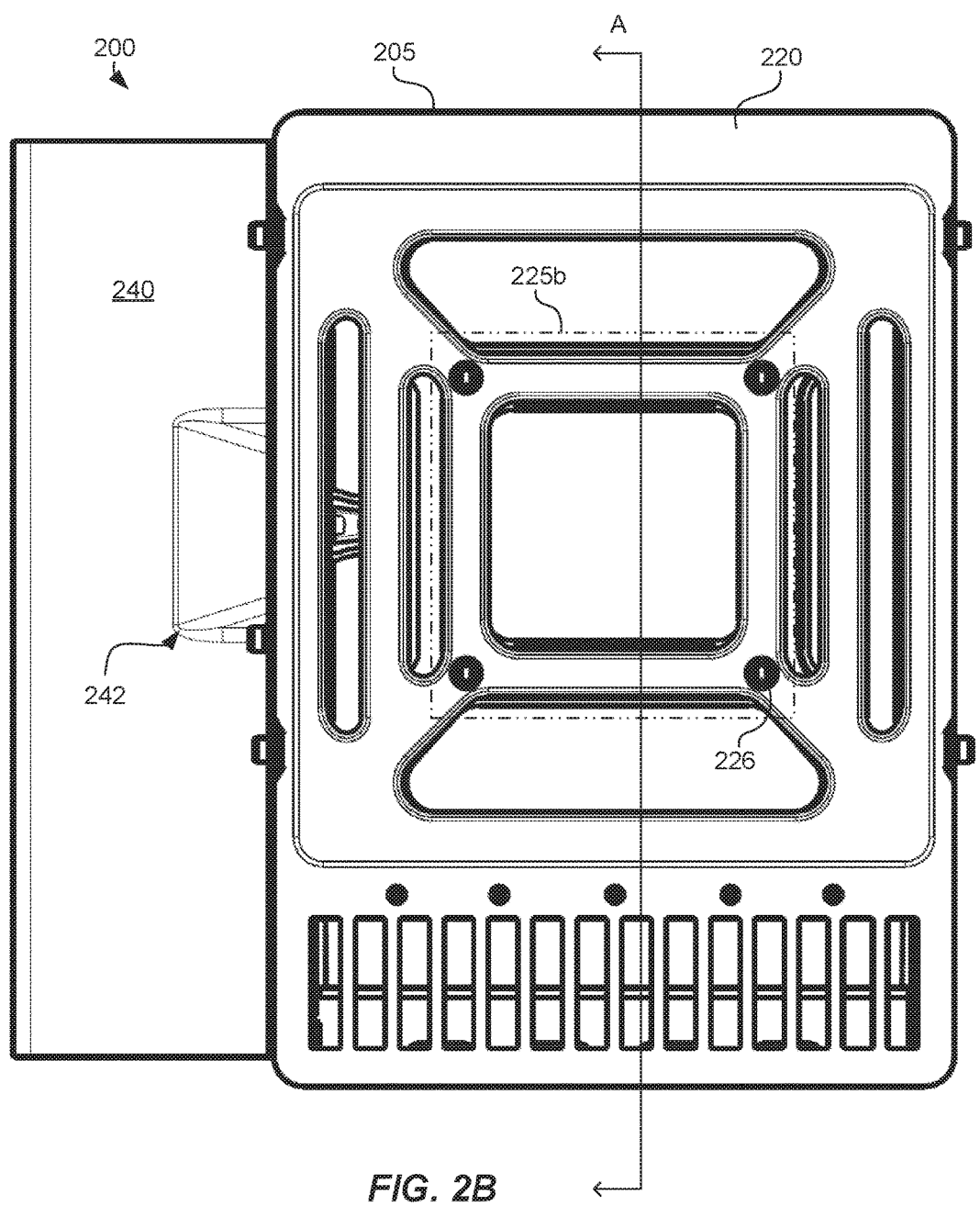
Figure 2C:
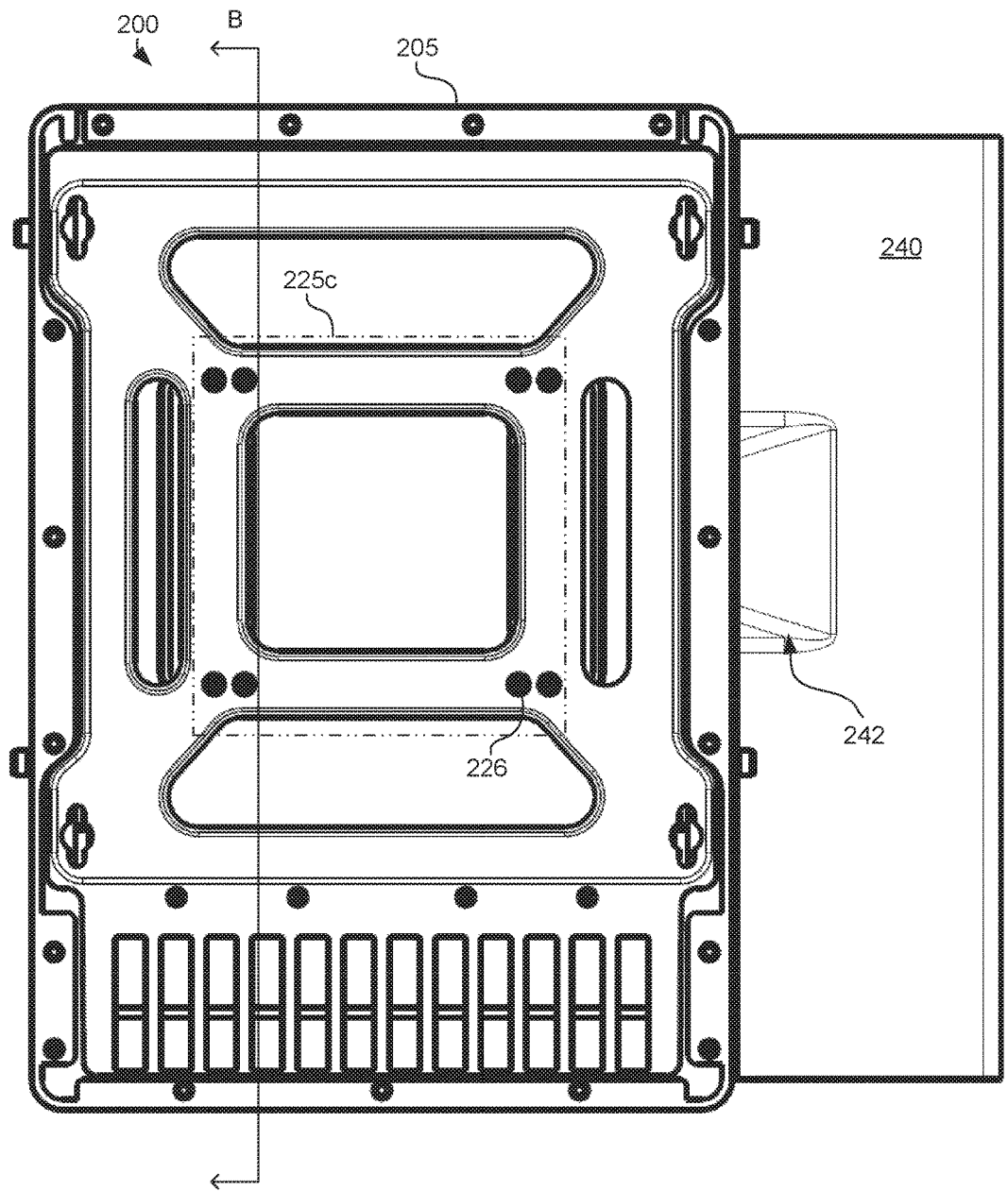

FIGS. 2B and 2C are side views of the example enclosure 200 discussed above. FIG. 2B shows an access cover 220, such as may be attachable to a display (e.g., by attachment to apertures, such as aperture 226, of mounting interface 225b). FIG. 2B also shows a port cover 240 attached to frame 205 of enclosure 200. Example port cover 240 includes a contact portion 242, such as to which a user may grip and apply pressure, such as to attach and release port cover 240 from frame 205.

FIG. 2C shows an opposing side of example enclosure 200 in which frame 205 is visible. Mounting interface 225c is also visible (e.g., similar to mounting interface 225a in FIG. 2A) comprising apertures, such as example aperture 226. In one case, port cover 240 may comprise a contact portion 242 on facing sides thereof, such as to facilitate attachment and removal of port cover 240 from frame 205.

Figure 2D:
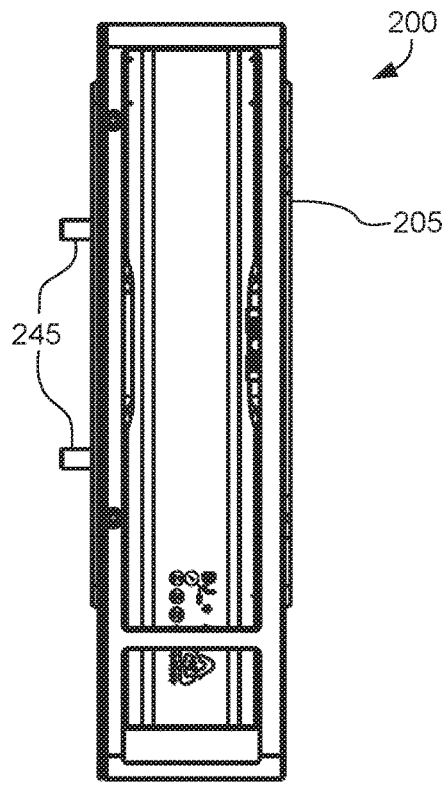
Figure 2E:
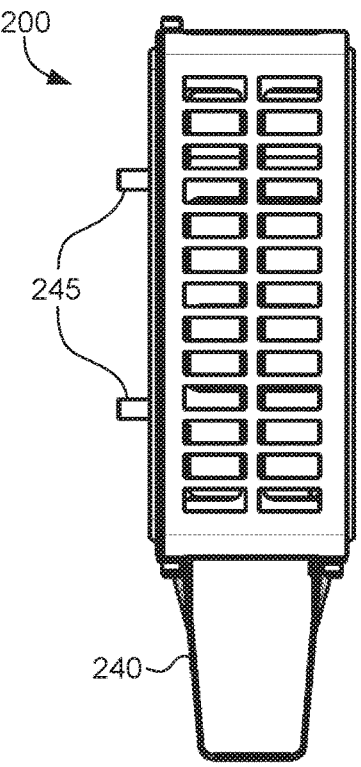
Figure 2F:
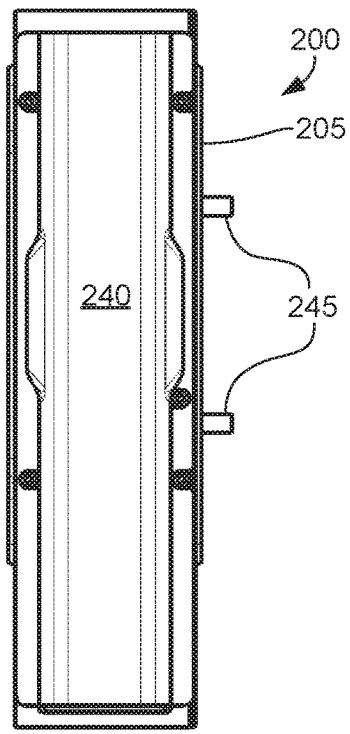
Figure 2G:
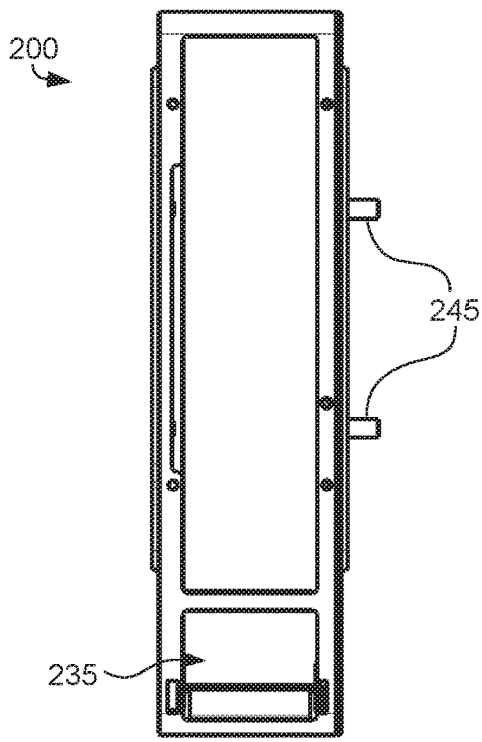

FIG. 2D is a view of enclosure 200 the direction indicated by A in FIG. 2B. As such, an interior of enclosure 200 is visible. Spacers 245 are shown connected to a side of enclosure 200 (e.g., to access cover 220). FIG. 2E is a bottom view of enclosure 200, showing port cover 240, spacers 245, and an underside of storage portion 235. FIGS. 2F and 2G show a same side of enclosure 200 (as shown by B in FIG. 2C), FIG. 2F with port cover 240 in place (e.g., attached to frame 205), and FIG. 2G without port cover 240. Spacers 245 may provide spacing between a display and an access cover of enclosure 200.

Figure 2I:
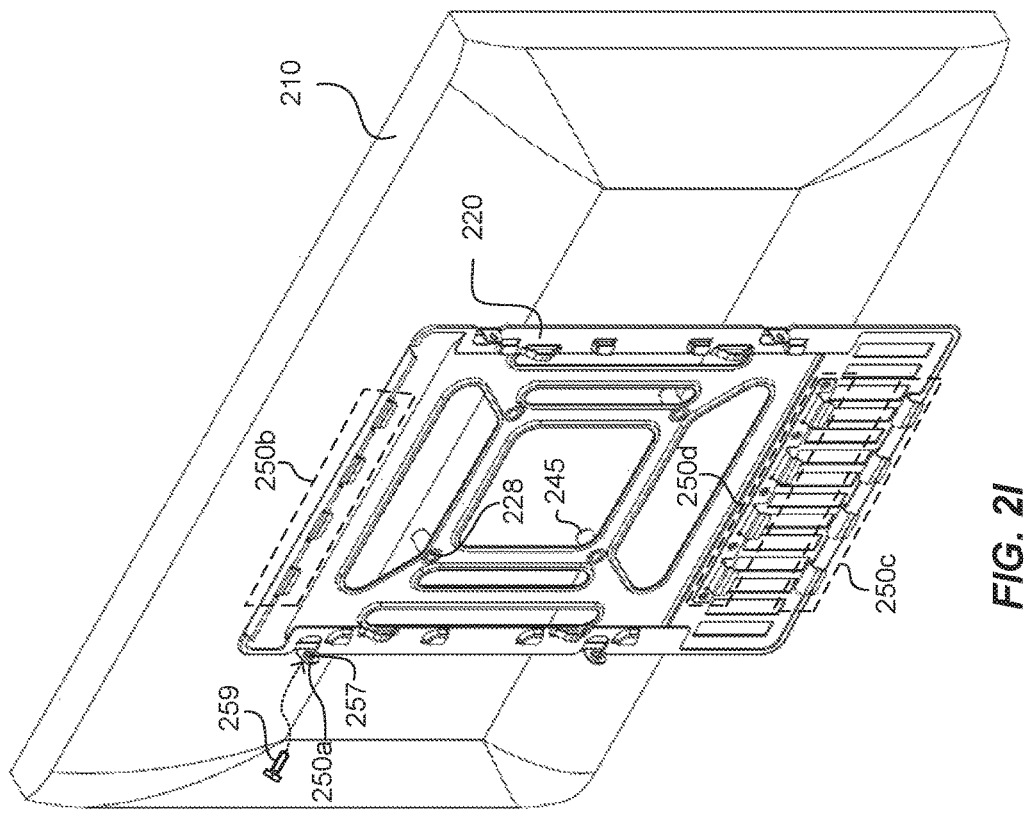
FIGS. 2H and 2I illustrate an example mounting enclosure frame and access cover attached to a display.
Figure 2H:
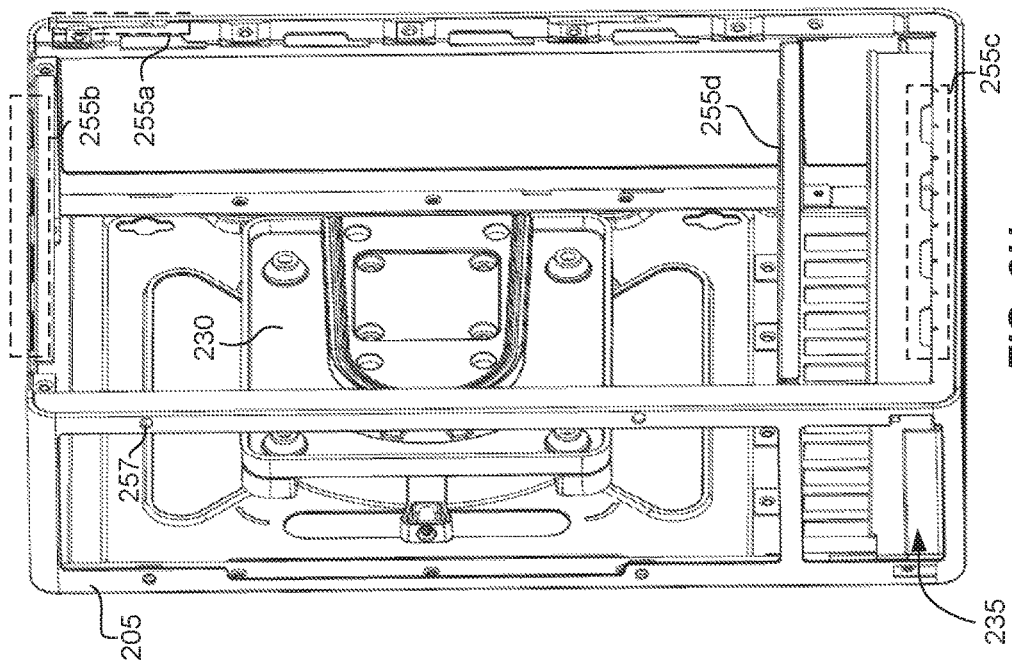

FIGS. 2H and 2I show how tabs of access cover 220 might engage frame 205 of enclosure 200 in one example case. By way of example, FIG. 2H shows example receptacles (e.g., slots) 255a, 255b, 255c, and 255d into which example tabs 250a, 250b, 250c, and 250d (see FIG. 2I) may engage. Furthermore, aperture 257 represents an example aperture in frame 205 (FIG. 2H) and tab 250a (FIG. 2I) through which a fastener (e.g., example fastener 259), such as a thumb screw, may pass to secure access cover 220 to frame 205 (e.g., shown by dotted line and arrow from fastener 259 to aperture 257). Thus, in cases such as shown in FIGS. 2H and 2I, access cover 220 may engage frame 205 through corresponding apertures of access cover 220 and frame 205.

In operation, display 210 may be attached to access cover 220, such as by attaching fasteners, such as example fastener 228, through apertures of access cover 220 (e.g., as port of a mounting interface) and spacers, such as spacer 245, and into apertures of display 210 (not shown; display 210 may comprise a mounting interface corresponding to the mounting interface of enclosure 200).

Once display 210 is secured, access cover 220 may be attached to frame 205 of enclosure 200 such that tabs 250a, 250b, 250c, and 250d engage receptacles, such as receptacles 255a, 255b, 255c, and 255d of frame 205. It is noted that some tabs are directed in a downward direction, similar to tabs 250b, 250c, and 250d, may be desirable, such as to engage access cover 220 such that display 210 may be securely engaged in enclosure 200, such as by gravity. Furthermore, fasteners may be used to further secure access cover 220 to enclosure 200. In one case, fasteners, such as screws or bolts, may be secured to tabs of access cover 220 (e.g., tab 250a). As should be appreciated, such an arrangement may make possible installation and/or removal of a display, such as by a single person (e.g., as opposed to approaches in which one person holds a display in place while another person attaches the display to a mount or enclosure).

It is noted that the foregoing is given merely by way of example. Other implementations are contemplated by claimed subject matter. Indeed, it is contemplated that an example enclosure may have tabs rather than receptacles, and the example tabs may engage receptacles of an example access cover. Furthermore, while the above example implementation comprises a sliding access cover, in another case the access cover and/or enclosure may comprise latches or other like securing mechanisms.

Figure 3B:
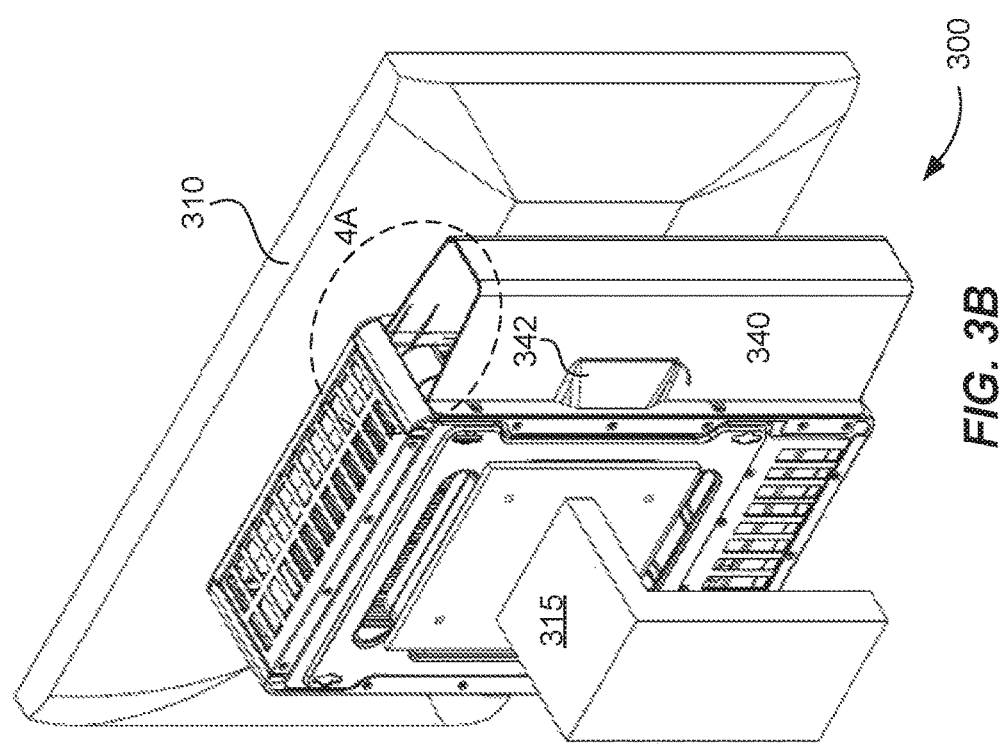
FIGS. 3A and 3B illustrate attachment of an example access cover to an example enclosure.
Figure 3A:
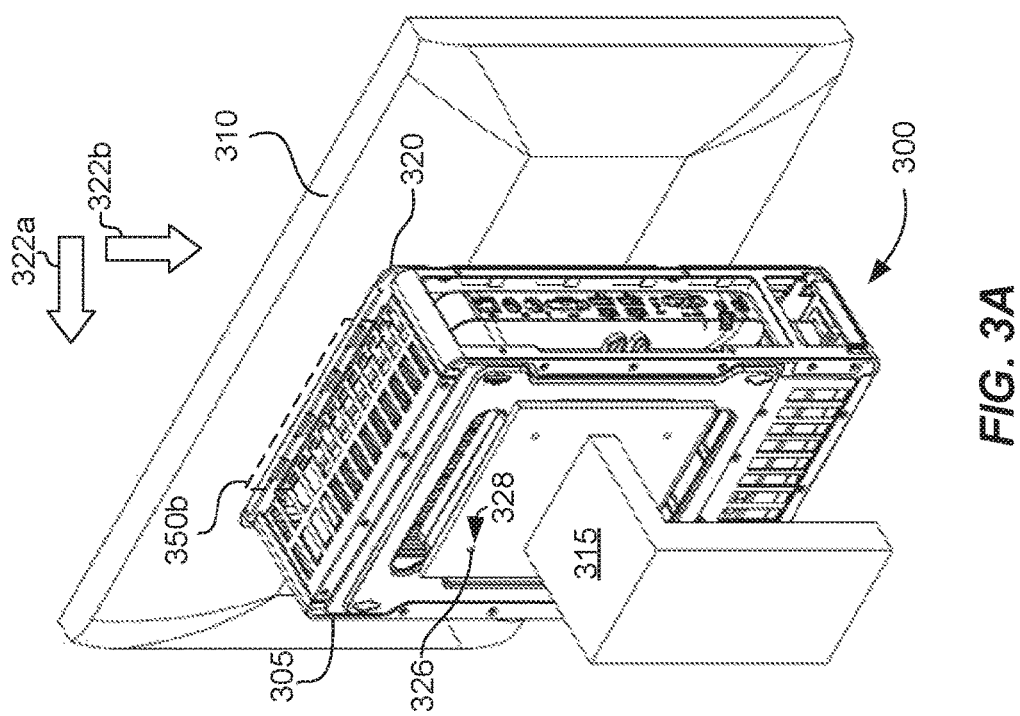

FIGS. 3A & 3B illustrate attachment of an example access cover 320 to an example enclosure 300. As shown, a display 310 may be attached to access cover 320. Additionally, enclosure 300 may be attached to an example support structure 315, such as by fasteners (e.g., example fastener 326) via apertures (e.g., example aperture 328) of a mounting interface. In one case, access cover 320 may be slidably attachable and detachable to and from a frame 305 of enclosure 300. Consistent with the discussion of FIGS. 2H and 2I, above, tabs 350b (among other things) may engage receptacles of enclosure 300 to enable securing of both access cover 320 and display 310. In one case, such securing of access cover 320 to enclosure 300 may comprise moving access cover 320 in a direction approximating 322a (e.g., towards enclosure) to engage tabs of access cover 320 within receptacles of enclosure 300. Subsequently, access cover 320 may move in a direction approximating 322b. In one case, fasteners may be used to fix access cover 320 to the frame of enclosure 300.

Turning to FIG. 3B, port cover 340 may be attached to enclosure 300 in order to obscure or otherwise cover ports of a computing device. Port cover 340 may take a form to allow cables to run in proximity to ports of the computing device. A dotted circle 4A is provided to indicate that a discussion of port cover 340 follows in relation to FIG. 4A.

Figure 4B:
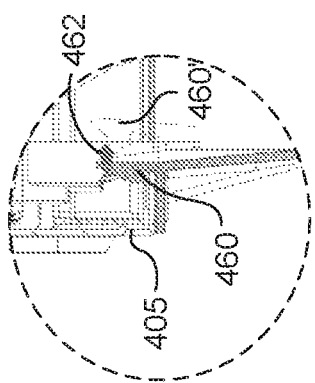
FIGS. 4A and 4B show an example port cover and portions thereof.
Figure 4A:
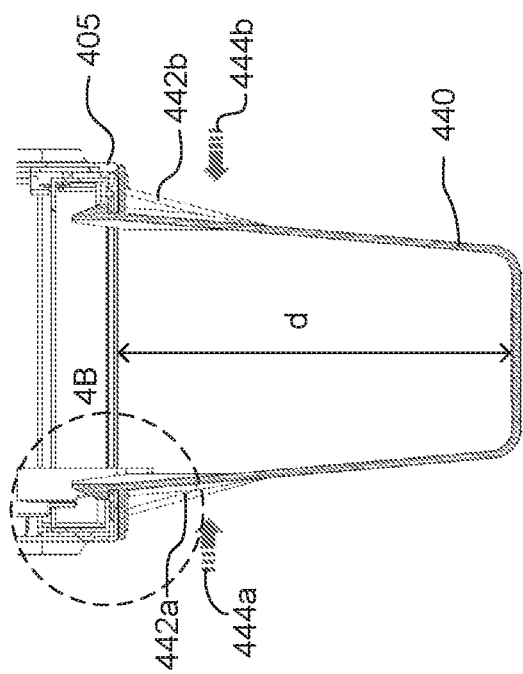

FIG. 4A illustrates an example port cover 440 (shown from above) attached to an example frame 405 of an enclosure (e.g., enclosure 300). As is shown, port cover 440 may have contact portions 442a and 442b, which may be gripped to apply a force, as in directions shown by arrows 444a and 444b, to port cover 440. Port cover 440 may comprise a material with an elasticity, such as to respond to force applied via contact portions 442a and 442b (e.g., it may be deformable). In one case, for example, port cover 440 may comprise a metal, a metalloid, a polymer, a plastic, etc.

Further, as shown, port cover 440 may define an interior cavity, such as to allow a distance d between ports of a computing device and an interior extremity of port cover 440. The distance d may be determined to be sufficient to allow connectors and cables to be arranged within port cover 440. For example, DisplayPort (DP) connectors, Digital Visual Interface (DVI) connectors, Video Graphics Array (VGA) connectors, High-Definition Multimedia Interface (HDMI) connectors, etc. represent example connectors that may be connected to ports of a computing device and obscured by port cover 440. As such, distance d may be selected to accommodate desired connectors.

Dotted circle 4B in FIG. 4A shows a portion of FIG. 4A shown in greater detail in FIG. 4B. As shown, prong 460 may engage a portion of frame 405 at a first position. Also shown by the prong outline 460', responsive to an application of pressure (e.g., to contact portions 442a and 442b, in FIG. 4A), prong 460 may retract from frame 405 to a position (as illustrated by prong outline 460'), such as to allow port cover 440 to be installed or removed from frame 405.

Figure 5:
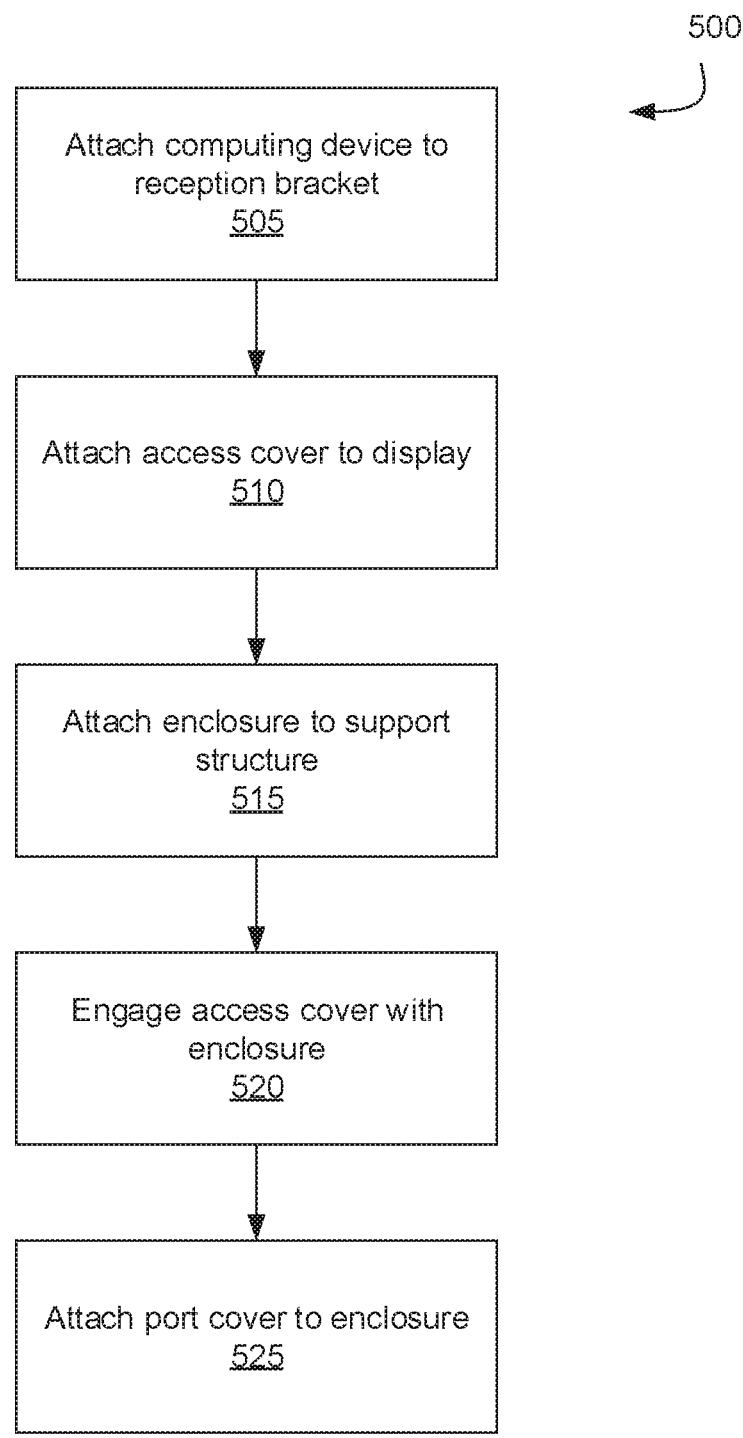
FIG. 5 is a flow chart of an example method for using an example enclosure.

FIG. 5 illustrates an example method 500 for using an enclosure for a computing device. For example, at example block 505, an enclosure, such as enclosure 100 in FIGS. 1A and 1B, enclosure 200 in FIGS. 2A-2H, and enclosure 300 in FIGS. 3A and 3B, may be used to secure a computing device. In one case, a computing device (e.g., computing device 102) may be secured within the enclosure using a reception bracket, such as reception bracket 130. Attaching the computing device to the reception bracket may be done without tools (e.g., without a screwdriver or bolts), such as engaging the reception toolessly. As such, in one implementation, a reception bracket may comprise a toolless reception bracket.

At an example block 510, an access cover (e.g., access cover 120) may be attached to a display (e.g., display 110). For example, fasteners may be used to attach the access cover to the display via apertures of a mounting interface, as discussed above in relation to FIG. 1A, by way of example.

At an example block 515, an enclosure may be attached to a support structure (e.g., support structure 115). For example, fasteners may be used to attach a mounting interface (e.g., mounting interface 125a) of a frame (e.g., frame 105) to a mounting interface of a support structure as discussed above in relation to FIG. 1A, by way of example.

At an example block 520, the access cover may engage with the enclosure. For example, tabs of the access cover may engage within receptacles of the frame of the enclosure, as discussed above in relation to FIGS. 1B, 2H, 2I, and 3A, by way of example. In one case, fasteners may be used to further secure the access cover to the enclosure.

At an example block 525, a port cover (e.g., port cover 140) may attach to the enclosure. For example, prongs of the port cover may engage with portions of the frame of the enclosure, as discussed above in relation to FIG. 1A.

In view of the foregoing, an example enclosure may comprise a reception bracket to receive a computing device and a slidable access cover to which a display may be attached.

For example, in one implementation an example enclosure comprises a frame to be arranged between a display device and a support structure. The enclosure also comprises a slidable access cover to slidably engage the frame of the enclosure. A mounting interface is to connect the frame to the support structure. The enclosure also includes a computing device reception bracket to receive a computing device and a power supply storage portion.

In one implementation, the slidable access cover comprises tabs to engage receptacles of the frame. In another, the slidable access cover is to support the connected display device during installation of fasteners through corresponding apertures of the access cover and the frame. In one case, the fasteners might be thumbscrews. The computing device reception bracket might be a toolless reception bracket. The toolless reception bracket is to allow installation and removal of a computing device without disassembly of the enclosure. In one case, the enclosure includes a port cover that is arranged to have a depth sufficient to receive a DP connector. Also, the port cover can be deformable to enable attachment and detachment from the frame.

Another example mounting enclosure comprises a slidable access cover comprising tabs and connectable to a display device. The enclosure comprises a frame comprising receptacles to receive the tabs of the slidable access cover and arranged to engage the access cover to the frame. A computing device reception bracket is arranged in the frame to receive a computing device. A storage portion is arranged to receive cabling, a power supply, or a combination thereof, from the computing device. And the enclosure further includes a port cover to obscure the cabling.

In one implementation, engagement of the tabs of the slidable access cover in the receptacles of the frame can support the weight of a display device connected to the slidable access cover to enable installation of fasteners through corresponding apertures of the slidable access cover and the frame. The fasteners might include thumbscrews.

In one case, the computing device reception bracket might be a toolless reception bracket. The toolless reception bracket can enable installation and removal of a computing device without disassembly of the computing device mounting enclosure. The frame of the computing device mounting enclosure can be arranged between the display device and a support arm can be connected to the frame. The port cover might be deformable for toolless engagement with the frame. And the port cover might have a depth sufficient to enclose a DP connector.

An example method of installing a computing device in an example enclosure includes attaching the computing device to a toolless computing device reception bracket arranged in the enclosure. The method includes attaching a slidable access cover to a display device. The method includes attaching a frame of the enclosure to a support structure. The method includes sliding the slidable access cover into place on the frame such that tabs of the slidable access cover engage receptacles of the frame. And the method also includes attaching a port cover to the frame to enclose a portion of the computing device.

In one implementation, attaching the port cover can comprise squeezing the port cover. Engagement of the tabs of the slidable access cover into the access cover receptacles can support the display device for installation of fasteners through corresponding apertures in the slidable access cover and the frame. The method can further include arranging a power supply of the computing device in a storage portion of the frame.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A mounting enclosure comprising:
    a frame to be arranged between a display device and a support structure;
    a slidable access cover to slidably engage the frame of the mounting enclosure;
    a mounting interface to connect the frame to the support structure;
    a computing device reception bracket to receive a computing device; and
    a power supply storage portion.

2. The mounting enclosure of claim 1, wherein the slidable access cover comprises tabs to engage receptacles of the frame.

3. The mounting enclosure of claim 2, wherein the slidable access cover is to support the connected display device during installation of fasteners through corresponding apertures of the access cover and the frame.

4. The mounting enclosure of claim 3, wherein the fasteners comprise thumbscrews.

5. The mounting enclosure of claim 1, wherein the computing device reception bracket comprises a toolless reception bracket.

6. The mounting enclosure of claim 5, wherein the toolless reception bracket is to allow installation and removal of a computing device without disassembly of the mounting enclosure.

7. The mounting enclosure of claim 1 further comprising a port cover that is deformable to enable attachment and detachment from the frame.

8. The mounting enclosure of claim 7, wherein the port cover is arranged to have a depth sufficient to receive a DP connector.

9. A computing device mounting enclosure comprising:
    a slidable access cover, the slidable access cover comprising tabs and connectable to a display device;
    a frame comprising receptacles to receive the tabs of the slidable access cover and arranged to engage the access cover to the frame;
    a computing device reception bracket arranged in the frame to receive a computing device;
    a storage portion arranged to receive cabling, a power supply, or a combination thereof, from the computing device; and
    a port cover to obscure the cabling.

10. The computing device mounting enclosure of claim 9, wherein engagement of the tabs of the slidable access cover in the receptacles of the frame is to support the weight of a display device connected to the slidable access cover to enable installation of fasteners through corresponding apertures of the slidable access cover and the frame.

11. The computing device mounting enclosure of claim 10, wherein the fasteners comprise thumbscrews.

12. The computing device mounting enclosure of claim 9, wherein the computing device reception bracket comprises a toolless reception bracket.

13. The computing device mounting enclosure of claim 12, wherein the toolless reception bracket is to enable installation and removal of a computing device without disassembly of the computing device mounting enclosure.

14. The computing device mounting enclosure of claim 9, wherein the frame of the computing device mounting enclosure is to be arranged between the display device and a support arm connected to the frame.

15. The computing device mounting enclosure of claim 9, wherein the port cover is deformable for toolless engagement with the frame.

16. The computing device mounting enclosure of claim 15, wherein the port cover has a depth sufficient to enclose a DP connector.

17. A method of installing computing device in an enclosure, the method comprising:
    attaching the computing device to a toolless computing device reception bracket arranged in the enclosure;
    attaching a slidable access cover to a display device;
    attaching a frame of the enclosure to a support structure;
    sliding the slidable access cover into place on the frame such that tabs of the slidable access cover engage receptacles of the frame; and
    attaching a port cover to the frame to enclose a portion of the computing device.

18. The method of claim 17, wherein attaching the port cover comprises squeezing the port cover.

19. The method of claim 17, wherein engagement of the tabs of the slidable access cover into the receptacles supports the display device for installation of fasteners through corresponding apertures in the slidable access cover and the frame.

20. The method of claim 17, further comprising arranging a power supply of the computing device in a storage portion of the frame.

* * * * *

UNITED STATES PATENT AND TRADEMARK OFFICE
CERTIFICATE OF CORRECTION

PATENT NO. : 10,126,787 B1
APPLICATION NO. : 15/708587
DATED : November 13, 2018
INVENTOR(S) : Randol D. Aldridge et al.

Page 1 of 1

It is certified that error appears in the above-identified patent and that said Letters Patent is hereby corrected as shown below:

In the Claims

In Column 8, Claim 17, Line 40, after "installing" insert -- a --.

Signed and Sealed this
Nineteenth Day of February, 2019

Andrei Iancu
*Director of the United States Patent and Trademark Office*